United States Patent [19]
Korodi

[11] 3,823,961
[45] July 16, 1974

[54] REMOVEABLE SAFETY PLUG FOR FIFTH WHEEL SLOT

[76] Inventor: Miklos B. Korodi, 440 E. 79th St., New York, N.Y. 10021

[22] Filed: Feb. 9, 1973

[21] Appl. No.: 331,287

[52] U.S. Cl. ............................ 280/432, 280/433
[51] Int. Cl. ....................... B62d 53/10, B60d 1/12
[58] Field of Search ............................ 280/432, 433

[56] References Cited
UNITED STATES PATENTS

| | | | |
|---|---|---|---|
| 2,294,710 | 9/1942 | Berg et al. | 280/432 |
| 2,784,986 | 3/1957 | Finch et al. | 280/432 |
| 3,722,918 | 3/1973 | Conner | 280/432 |

*Primary Examiner*—Leo Friaglia
*Attorney, Agent, or Firm*—Frederic C. Dreyer

[57] ABSTRACT

A safety lock for forward insertion into the rearward-opening, kingpin-receiving slot of a conventional fifth wheel plate, behind an associated kingpin, to block the kingpin-slot rearward of the kingpin and limit rearward movement of the latter in the even of failure of the conventional kingpin-latching structure. The abutment body includes latch structure releasably engageable with the fifth wheel plate to lock the abutment body within the kingpin slot against rearward movement therein.

6 Claims, 3 Drawing Figures

PATENTED JUL 16 1974　3,823,961

REMOVEABLE SAFETY PLUG FOR FIFTH WHEEL SLOT

BACKGROUND OF THE INVENTION

Tractor-trailer trucks conventionally include forward tractor-vehicles provided with fifth wheel plates having rearwardly-opening slots formed therein and rear-trailing, semitrailer vehicles. The semi-trailers are provided with depending kingpins forwardly-receivable into seated position in the forward ends of the kingpin-receiving slots. The fifth wheel plates are provided with releasable latching structure for securing the kingpins in the forward ends of the slots in a manner such that the depending kingpins are journalled in the forward ends of the slots, thereby affording relative angular displacement of the tractor and semi-trailer vehicles about the upstanding pivot axis defined by the kingpin.

While the structure utilized to latch a semi-trailer kingpin within the forward end of an associated fifth wheel plate-slot is sufficient — in most cases — to securely lock the semi-trailer to the tractor, latch failure due to wear, metal fatigue, vehicle collisions, "jacknifing" and other reasons can sometimes occur.

SUMMARY OF THE INVENTION

The present invention has been constructed to provide a fail-safe method of insuring against release of a semi-trailer kingpin from the forward end of the associated fifth wheel plate-slot. The invention consists of an abutment body which may be horizontally-forwardly inserted into the fifth wheel plate-slot subsequent to the associated semi-trailer kingpin being conventionally latched in position at the forward end of the slot. The abutment body includes its own latching structure cooperable with modified portions of the associated fifth wheel plate to releasably latch the abutment body in position closely behind the associated semi-trailer kingpin and conventional, kingpin-latching structure. The forward end of the abutment body includes a spring-urged abutment element against which the associated kingpin may abut in the event of failure of the conventional kingpin latching structure.

This invention provides a readily insertable abutment body for the rear end portion of the slot formed in a fifth wheel plate. A latch-structure releasably engageable with slightly modified portions of the associated fifth wheel plate prevents rearward movement of the abutment body relative to the fifth wheel plate, whereby in the event of failure of the conventional latching structure of the fifth wheel plate and the abutment body will block rearward movement of the associated kingpin relative to the fifth wheel plate.

This invention provides a safety apparatus constructed in a manner whereby it may be used in conjunction with existing fifth wheel plates having relatively minor modifications which may be quickly made thereto.

In general, the preferred form of the present invention provides an abutment body for releasably latched engagement in the rearwardly-opening slot of a kingpin plate behind an associated kingpin conventionally latched in the forward end of the slot and which will conform to conventional forms of manufacture, be of simple construction and easy to use so as to provide a device that will economically feasible, long lasting and relatively trouble free in operation.

DESCRIPTION OF THE PREFERRED EMBODIMENT

Figure 1:
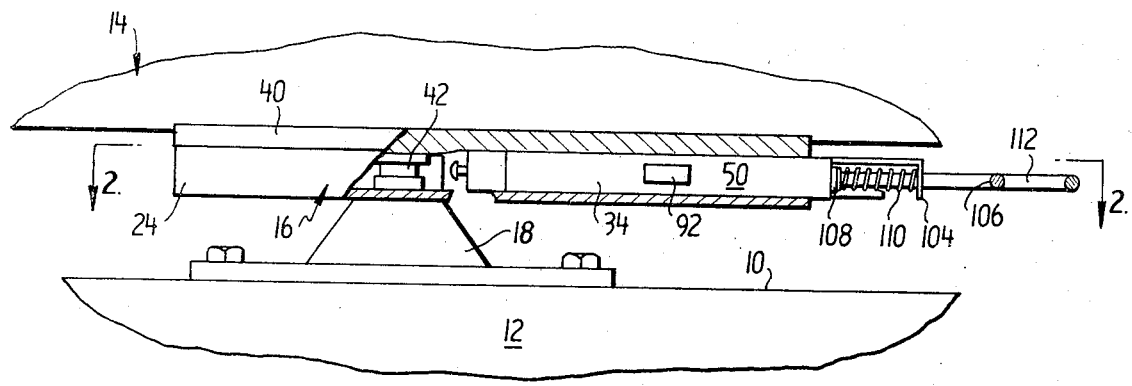
FIG. 1 is a fragmentary side elevational view of the releasably coupled portions of a tractor and semi-trailer with portions of the tractor fifth wheel plate being broken away and illustrated in vertical section and with the abutment body of the instant invention shown in operative position to limit rearward movement of the semi-trailer kingpin in the event of failure of the kingpin latching mechanism.

With attention now invited more specifically to FIG. 1 of the drawings, there may be seen the rearward portion 10 of a tractor vehicle 12 to which the forward end portion of a semi-trailer vehicle 14 is coupled.

A generally conventional fifth wheel plate 16 is oscillatably supported from the rear portion 10 of the vehicle 12 by means of a pair of opposed journal-block assemblies 18. As can best be seen from FIG. 2 of the drawings, the fifth wheel plate 16 comprises a horizontally-elongated hollow housing consisting of upper and lower plates 20 and 22 interconnected by means of upstanding peripheral wall portion 24 extending along opposite sides of the plate 16 and about the forward periphery of the plate 16. The plate 16 defines a rearwardly opening entrance slot 26 extending vertically therethrough and the entrance slot 26 includes a forward, constant-width portion 28 rounded at its forward extremity 30.

A rearward portion 32 of the slot tapers forwardly toward and opens into the rear end of the forward portion 28. The rear portion 32 of the slot 26 includes rearwardly divergent side wall portions 34 extending between the upper and lower plates 20 and 22. The forward portion 28 includes side wall portions 36 extending between the upper and lower plates 20 and 22.

The semi-trailer vehicle 14 includes an underside bearing plate 40 downwardly from which a cylindrical kingpin 42 projects. The kingpin 42 is receivable in the entrance slot 26 and seatable in the semi-cylindrical forward end 30 of the forward portion 28 of the slot 26. In addition, a conventional latch such as pivoted-jaw members 44 are supported from the plate 16 between the upper and lower plates 20 and 22 and may be swung into and out of the positions thereof illustrated in FIG. 2 of the drawings, locking the kingpin 42 in the forward end 30 of the slot 26.

Conventionally, the jaws 44 are provided with associated actuating structure (not shown) whereby the jaws 44 may be shifted into and out of latched position and in most cases this actuating structure is sufficient to prevent release of the kingpin 42 for rearward movement in the slot 26. However, there have been instances in which such actuating structure has failed with the result that the associated kingpin is released and thus the corresponding semi-trailer can become accidentally disengaged from its tractor. This is particularly disastrous when the semi-trailer is carrying hazardous cargo, such as, flammable hydrocarbons or explosives.

The present invention resides in the provision of a safety lock comprising an abutment-body 50 which is generally triangular in plan shape. The abutment body includes upper and lower walls 52 and 54 interconnected by means of upstanding opposite side walls 56 and 58 extending therebetween. In addition, the top wall 52 and the side walls 56 and 58 extend rearward of the rear marginal-portion of the bottom wall 54. Also, the rear ends of the side walls 56 and 58 are interconnected by means of an upstanding rear wall 60 extending therebetween and secured at its upper marginal-portion to the rear marginal edge-portion of the upper or top wall 52.

The forward end of the body 50 includes an extension 62 defined between parallel, forward terminal ends 64 and 66 of the side walls 56 and 58. The forward end of the extension 62 is closed by means of a forward wall 67 having an opening 68 formed therein through which the forward, diametrically reduced shank-portion 70 of a piston 72 is slidingly received. The forward end of the shank portion 70 includes a diametrically enlarged head 73 disposed immediately rearward of the jaws 44 and the piston is slidably received within a forwardly opening sleeve 74 abutted against the rear side of forward wall 67 and secured between the terminal ends 64 and 66 of the side walls 56 and 58. The rear end of the sleeve 74 is closed by means of a rear end wall 76 and a compression spring 78 is disposed within the sleeve 74 between the forward inner surface of the rear wall 76 and the rear face of the piston 72. Thus, the piston 72 is urged forwardly to its limit position engaged with the inner surface of the front wall 67. An appropriate signal charge 75 (a blank cartridge or the like) is mounted within the sleeve 74 inward of piston 72 in a position to explode and cause an audible signal upon release and rearward movement of the kingpin 42.

A pair of pivot shafts 80 are secured through the top and bottom walls 52 and 54 of the body 50 and have a pair of locking lugs 82 pivoted thereon. The locking lugs 82 include forward-end arm portions 84 between which an expansion spring 86 is secured. The side walls 56 and 58 of the body 50 have openings 88 formed therethrough registered with corresponding openings 90 formed in the opposing side wall portions 34 of the tractor's fifth wheel 16. The lugs 82 include rearward portions 92 which are projectible through both the openings 88 and 90 and corresponding ends of a pair of connecting links 94 are pivotally connected to the rear portions 92 of the lugs 82. The other pair of ends of the connecting links 94 are pivotally anchored as at 96 to the forward end of a pull bar 98.

The rear wall 60 has an opening 100 formed therethrough and the mid-portion of the pull bar 98 is slidably received through the opening 100. In addition, the central portion of the top wall 52 includes a rearwardly-projecting support arm 102 terminating rearwardly in a downturned flange 104 through which the rear end portion of the pull bar 98 is slidingly received. The rear terminal end of the pull bar 98 includes a cross handle 106 and that portion of the pull bar 98 disposed immediately rearward of the rear wall 60 includes an abutment 108 abutted against the rear surfaces of the rear wall 60 about the opening 100. A compression spring 110 is disposed about the pull bar 98 between the abutment 108 and the downturned flange 104. Therefore, the pull rod 98 is spring-biased to the forwardmost limit position thereof illustrated in FIGS. 1 and 2 of the drawings with the rear portions 92 of the lugs 82 projected through the openings 88 and 90, thereby locking the body 50 against rearward movement relative to the fifth wheel plate 16.

A U-shaped handle 112 projects rearwardly from the rear of the safety-lock body 50 and may be utilized to handle and to support the body 50 when the latter is inserted into the entrance slot 26.

Figure 2:
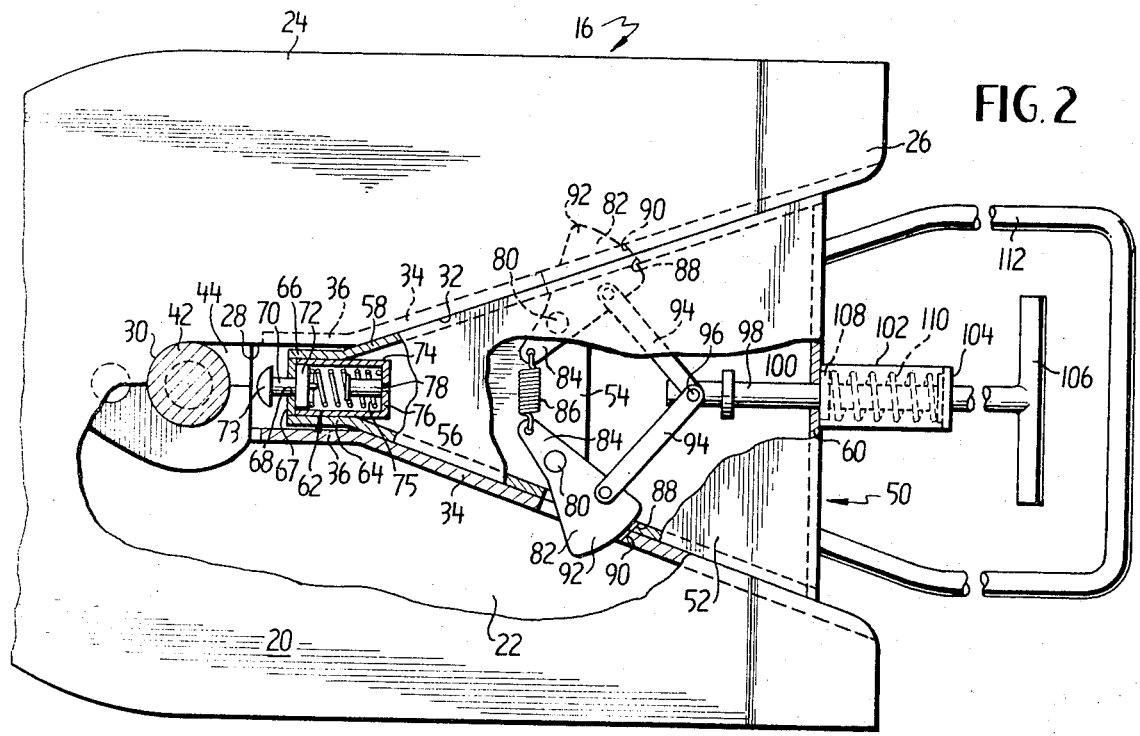
FIG. 2 is a fragmentary enlarged horizontal sectional view taken substantially upon the plane indicated by the section line 2—2 of FIG. 1 and with portions of the kingpin, the kingpin plate and the abutment body being broken away and illustrated in horizontal section.
Figure 3:
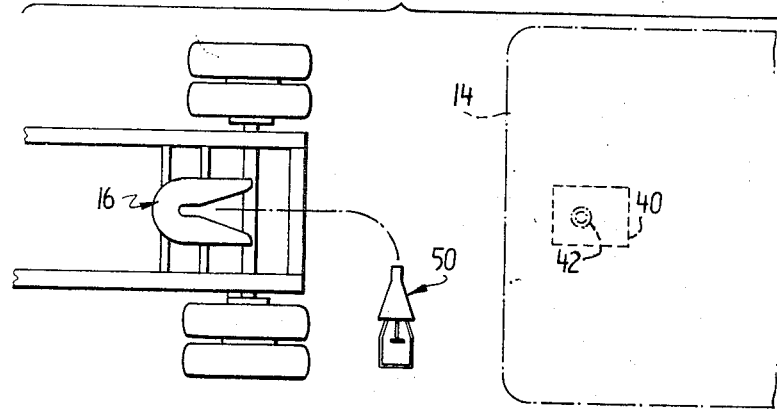
FIG. 3 is a schematic view of the safety lock in relation to a tractor and a semi-trailer.

In operation, after the kingpin 42 has been displaced forwardly in the slot 26 and the jaws 44 of the connectional latch have been pivoted to the operative positions thereof illustrated in FIG. 2 of the drawings in order to lock the kingpin 42 in position at the forward end of the slot 26, the safety-lock body 50 is placed into the entrance slot 26. As hereinbefore set forth, the handle 112 may be utilized in placing the body 50 within the slot 26.

As the safety-lock body 50 approaches its innermost position, the outer extremities of the lugs 82 engage the side wall portions 34 and are cammed inwardly until forward displacement of the body 50 in the slot 26 is sufficient to register the openings 88 with the openings 90. This of course will allow the compression spring 110 and the expansion spring 86 to swing the lugs 82 to their operative positions projected through the openings 88 and 90.

At this point, the head 72 is disposed immediately to the rear of the jaws 44 and is positioned to be engaged by the kingpin 42 and explode the charge 75 should the jaws 44 be rendered inactive and the kingpin 42 shift rearward in the slot 26. In this event, the rearward thrust of the kingpin 42 on the body safety-lock 50 will be transmitted directly through the lugs 82 to the edges of the side wall portions 34 defining the rearmost extremities of the openings 90. The lugs 82 thus are jammed between the edges of the adjacent openings 88 and 90 without structural dependence upon the links 94.

When it is desired to remove the body 50, the crosshead or handle 106 is grasped and pulled rearward so as to retract the lugs 82 and after the lugs 82 have been fully retracted the rearward pull on the handle 106 will serve to rearwardly displace the body 50 from the entrance slot 26.

It is herein pointed out that the openings 90 include both upper and lower extremities and therefore that the lugs 82 also serve to prevent vertical shifting of the safety-lock body 50 relative to the fifth wheel plate 16.

I claim:

1. A safety lock for use in conjunction with a fifth wheel plate of the type including a rearwardly opening entrance slot and a trailer kingpin rotatably anchored in the forward extremity of said slot, comprising an abutment body forwardly displaceable into said fifth wheel slot from the rear end thereof to a position at least closely adjacent the rearmost extremity of the normal position of said kingpin, said abutment body and said fifth wheel plate including first and second coacting portions thereof releasably anchoring said abutment body in said slot against rearward displacement relative to said fifth wheel plate, said body being positioned in said slot rearward of said pin in horizontal registry with the latter, the forward end of said abutment body including a forwardly projecting abutment element shiftable relative to said abutment body in front to rear direction between forwardmost and the rearmost limit positions, said abutment element projecting forward of the forward end of said abutment body when in said forward position, means operatively connected between said abutment body and said abutment element yieldingly biasing the latter toward its forward limit position, and signal means operable in response to a rearward shifting of said abutment element.

2. A safety lock for use in conjunction with a fifth wheel plate of the type including a rearwardly opening entrance slot and a trailer kingpin rotatably anchored in the forward extremity of said slot, comprising an abutment body forwardly displaceable into said fifth wheel slot from the rear end thereof to a position at least closely adjacent the rearmost extremity of the normal position of said kingpin, said abutment body and said fifth wheel plate including first and second coacting portions thereof releasably anchoring said abutment body in said slot against rearward displacement relative to said fifth wheel plate, said body being positioned in said slot rearward of said pin in horizontal registry with the latter, said body including opposite side wall portions spaced intermediate the opposite ends of said abutment body and said fifth wheel plate includes side walls defining the opposing portions of said slot, said side wall portions and said opposing side walls of said fifth wheel plate having registered horizontal openings formed therein, said horizontal openings in fifth wheel plate comprising said second coacting portions, said first coacting portions comprising stop lugs carried by opposite side portions of said abutment body and projectible through said registered openings.

3. The combination of claim 2 wherein said abutment lugs are oscillatably supported from said abutment body and swingable between retracted positions within the confines of the side walls of said body and extended limit positions projecting through said openings, and means connected between said abutment lugs yieldingly biasing the latter toward their extended positions.

4. The combination of claim 3 including a rearwardly-projecting reciprocal operator carried by said abutment body, means connecting said abutment lugs to said operator for swinging the abutment lugs to their retracted positions in response to rearward displacement of said operator.

5. The combination of claim 4 including means connected between said abutment body and said operator yieldingly biasing the latter forwardly relative to said abutment body.

6. The combination of claim 5 wherein the forward end of said abutment body includes a forwardly projecting abutment element shiftable relative to said abutment body in a front to rear direction between forwardmost and the rearmost limit positions, said abutment element projecting forward of the forward end of said abutment body when in said forward position, means operatively connected between said abutment body and said abutment element yieldingly biasing the latter toward its forward limit position, and signal means including an explosive charge operable in response to a rearward shifting of said abutment element.

* * * * *